April 24, 1928.

J. A. LEWELLYN 1,667,422

DEMAGNETIZER

Filed Nov. 13, 1920

John A Lewellyn
Inventor

By Geo E Kirk
Attorney

Patented Apr. 24, 1928.

1,667,422

UNITED STATES PATENT OFFICE.

JOHN A. LEWELLYN, OF TOLEDO, OHIO, ASSIGNOR, BY MESNE ASSIGNMENTS, TO ROBERT L. HINDS, OF TOLEDO, OHIO.

DEMAGNETIZER.

Application filed November 13, 1920. Serial No. 423,882.

This invention relates to apparatus for treating magnetizable material and articles for removing magnetic charge therefrom.

This invention has utility when incorporated in electromagnet demagnetizers, especially of the alternating current type, adapted to disperse magnetic conditions from tools and work, especially as arising from the use of magnetic chucks.

Referring to the drawings.

Figure 1:
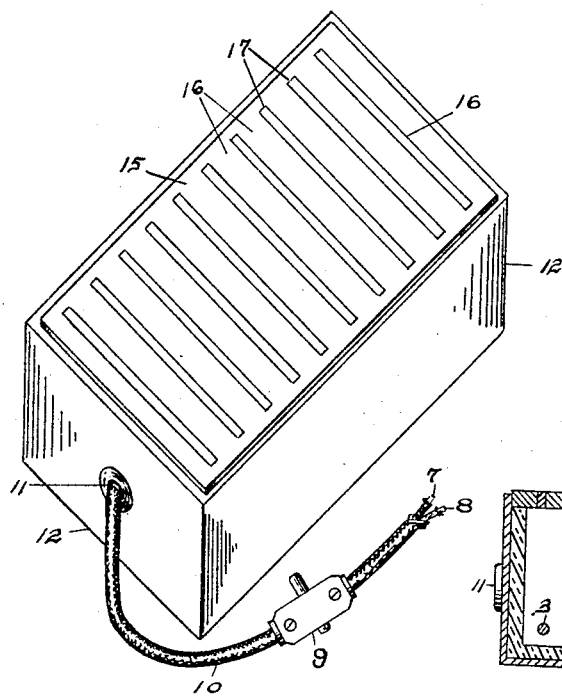
Fig. 1 is a perspective view of an embodiment of the invention as a work-bench tool or apparatus of alternating current type of electromagnet demagnetizer.
Figure 2:
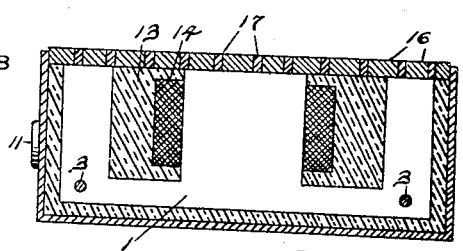
Fig. 2 is a longitudinal section through the apparatus of Fig. 1.
Figure 3:
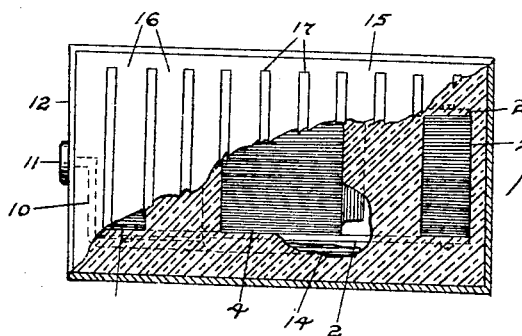
Fig. 3 is a plan view of the apparatus of Fig. 1, with parts broken away.
Figure 4:
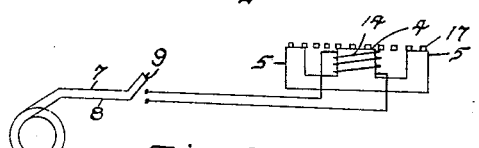
Fig. 4 is a wiring diagram.

Laminations 1, of soft steel or iron, selected of a character to readily give up magnetism and preferably with a low hysteresis loss, to reduce heating, are assembled between plates 2 and held by bolts 3. These assembled laminations form a core providing an intermediate major pole portion 4, and one on each side thereof, terminal pole portions 5. These terminal poles 5 taken together approximate in capacity the capacity of the intermediate pole 4.

From a source of current supply, as alternating current generator 6, lines 7, 8, may extend past switch 9 as an insulated covered cord 10 entering through opening 11 general housing or non-magnetic box 12, in which the core 4, 5, may be anchored by composition 13 of insulation material, which material may also envelop coil 14 in said housing 12. This coil 14 is shown as disposed about the intermediate or major pole 4, thereby energizing the major pole and simultaneously oppositely energizing the terminal poles 5. As the terminal poles 5 thus have the same polarity, there is a flux simultaneously in opposite directions from the pole 4.

In practice, the current supply may be 110 volt alternating current, sixty cycle, with the coil 14 of sufficient resistance properly to take care of such. As thus designed, it is readily connected by usual socket and plug to the normal lighting circuit. The demagnetizer so energized would have magnetic flux reversals responding to the current cycles, but each simultaneously in opposite directions from the major or intermediate pole 4, thereby promoting the establishment in the article to be treated of a built up magnetism as the article is moved inward from one end for thereby quenching any opposing magnetism, and then gradually working such magnetism down by moving the article off the opposite end of this device.

An armature 15 is sealed by the composition 13 as a closure or cover for the housing 12, rendering the structure as a whole moistureproof. This armature on its inner face is in contact with the several poles 4, 5. The magnetic flux changes due to the cycle frequency involves subjecting an article to be magnetized to many magnetic changes in passing across the armature 15 lengthwise from a terminal pole 5 across intermediate pole 4 and then past the remote terminal pole 5. Further breaking up of the magnetic fluxes in this region of magnetic influence is had by interrupting the continuity of the extent of the magnetic material in the general line of movement of the article across the armature 15. To this end, the armature 15 is of grid form with bar portions 16 parallel to each other extending transversely of the path across the three poles 4, 5 which serve to break up the field. In order that the armature may serve as a cover for the demagnetizer, as well as provide a platform over which the article to be treated may be conveniently slid or moved, interposed between the bars 16 is non-magnetic metal 17. These bars, in the normal energizing of the electro-magnet of this demagnetizer, develop polarities, with the intermediate weakened or nearly neutral regions. Accordingly in passing a drill, or some machine part which has a magnetic charge, even rapidly across the armature platform 16, 17, in a movement across the poles 5, 4, 5, there are encountered not only the many neutral intervals between the reversals of polarity and reversals of magnetic flux due to the alternating current, but there is additional magnetic influence disturbances due to the lower magnetic action at the non-magnetic regions 17 of the grid armature. In practice this insures such a weakened magnetic strain at the removal point of the article treated, that residual magnetism therein is negligible, if not practically all eliminated. One passing of the article in either direction over the three poles almost invariably completes the operation. Medially there is sufficient magnetism to effectively attack the charge of the article.

In the operation of the device herein, the switch 9 is closed for current flow through the coils thereby to energize the poles 4, 5. This current from the lines 7, 8, is alternating current and means that the poles 5 are say both positive as the pole 4 is negative, then with the reversal of the current, the pole 4 is positive and the poles 5 are negative. Inasmuch as this is alternating current, these fluctuations are of sign characteristic and recur very rapidly thereby crowding through the fluxes in the armature 15 which fluxes between the poles are interrupted by the non-magnetic regions 17. An article which is to be demagnetized may be placed upon this energized device, say at the left or cord end in Fig. 1 and gradually moved to the right or upper portion across this device in contact with the armature 15. The flux cycles of magnetism are in maximum as the device is in direct circuit between the pair of the poles or it may be of an extent to be in the two circuits between the outer poles and the inner pole. Gradual shifting of the article longitudinally of the device brings about the flux leakage from the armature into the article with such flux leakage as plus and then minus as the fluxes reverse, the peak of such fluxes being of a diminishing nature as the article is gradually shifted or slid clear of the armature 15.

What is claimed and it is desired to secure by Letters Patent is:

1. The method of demagnetizing a magnetically charged article comprising exposing the article to decreasing cycles of magnetic flux by placing said article in contact with magnetic poles carrying said flux and simultaneously of similar polarity and shifting the article from a position thereon transversely of the parallel extent of said poles to clear position away from said poles.

2. The method of demagnetizing a magnetically charged article comprising generating a zone of maximum magnetic flux reversing cycles, merging of said cycles to provide a neutral region and causing the article to move from the maximum zone to and out of said neutral region, said article during said movement being in contact with magnetic poles carrying said flux and simultaneously of similar polarity.

3. A demagnetizer including a section of influence including flux carrying poles to be contacted by the article to be demagnetized, an electromagnet for maintaining said section of influence, said electromagnet embodying simultaneously similar polarity terminal poles, a housing for sustaining the magnetic influence section and enclosing the electromagnet, and a non-conductor non-magnetic filler for the housing.

4. An alternating current electromagnet demagnetizer provided with two similar polarity regions and an armature having parallel non-magnetic strips transversely of said region.

5. An alternating current electromagnet provided with a laminated core having a major intermediate pole as a region of magnetic flux, and a pair of terminal pole portions together approximating the strength of magnetic flux of the intermediate pole portion, a coil for energizing the intermediate pole oppositely from the terminal poles, and a demagnetizing armature across said poles provided with a non-magnetic gap uniformly spaced from a pair of pole portions.

6. A demagnetizer comprising a three-pole electromagnet core, an alternating current coil simultaneously similarly energizing the first and third poles of said core, an armature across said poles, non-magnetic means set into said armature uniformly transversely of the direct flux between the poles to break up the regions of magnetic intensity, and a non-magnetic mounting for the armature housing the core and magnet coil.

In witness whereof I affix my signature.

JOHN A. LEWELLYN.